Figure 5:
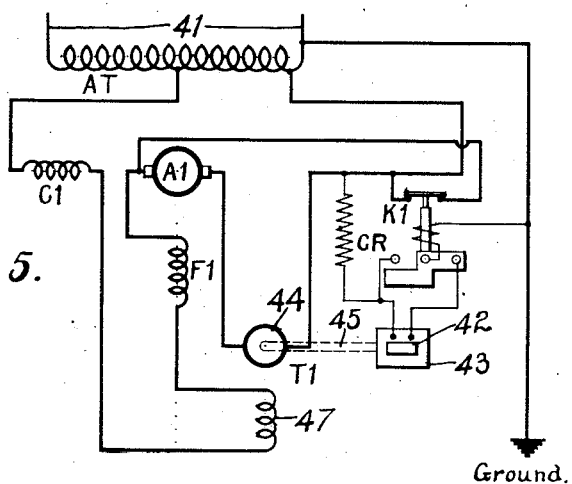

R. E. HELLMUND.
SYSTEM OF CONTROL.
APPLICATION FILED NOV. 25, 1914.
1,269,601.
Patented June 18, 1918.
3 SHEETS—SHEET 1.
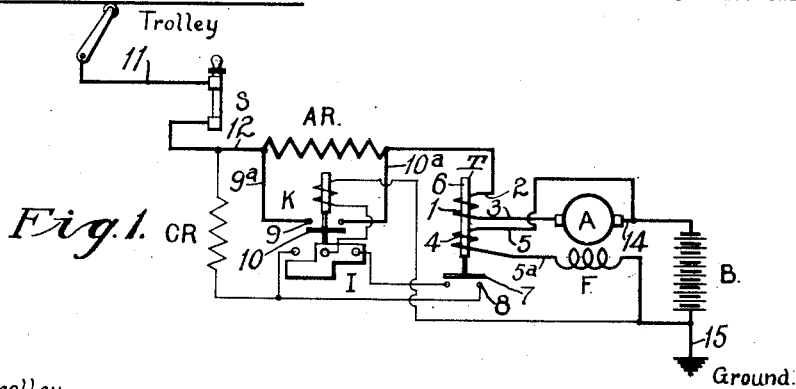
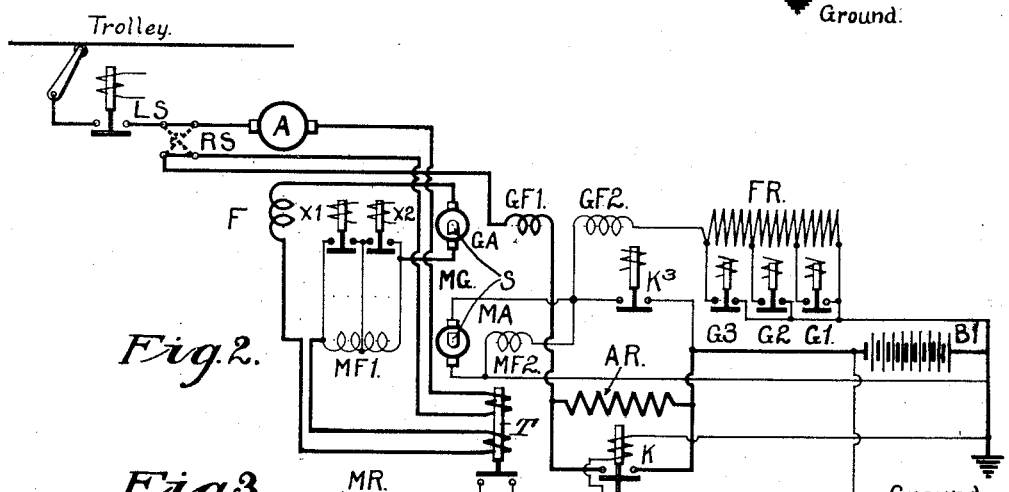
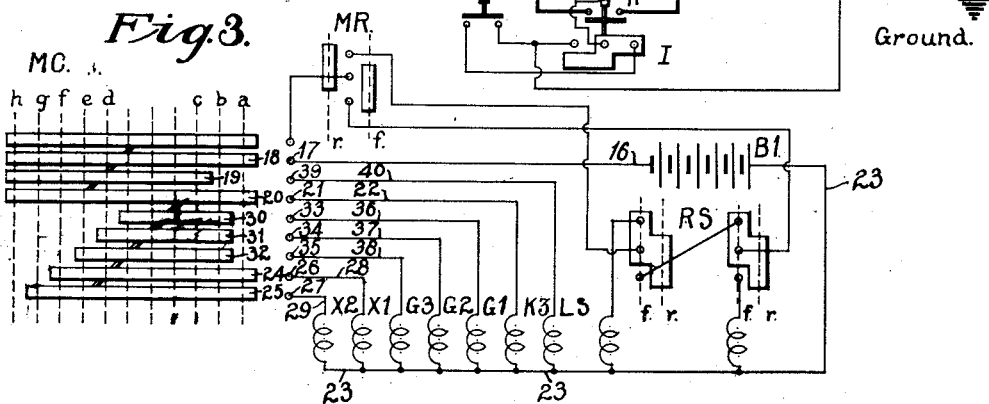
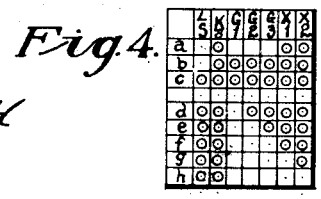
WITNESSES:
O. J. Fitzgerald
W. R. Coley
INVENTOR
Rudolf E. Hellmund.
BY
Wesley G. Carr
ATTORNEY

R. E. HELLMUND.
SYSTEM OF CONTROL.
APPLICATION FILED NOV. 25, 1914.

1,269,601.

Patented June 18, 1918.
3 SHEETS—SHEET 2.

WITNESSES:
R. J. Fitzgerald.
W. R. Coley

INVENTOR
Rudolf E. Hellmund.
BY
Wesley Glean
ATTORNEY

R. E. HELLMUND.
SYSTEM OF CONTROL.
APPLICATION FILED NOV. 25, 1914.

1,269,601.

Patented June 18, 1918.
3 SHEETS—SHEET 3.

WITNESSES:

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,269,601.  Specification of Letters Patent.  Patented June 18, 1918.

Application filed November 25, 1914. Serial No. 873,917.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control, and it has special reference to the automatic acceleration of electric motors that are adapted to propel electric railway vehicles and the like.

The object of my invention is to provide a system of the above-indicated character which shall embody relatively simple means for automatically accelerating an electric motor in a smooth and efficient manner, by increasing the voltage applied to the motor terminals from a supply circuit, upon a predetermined variation of motor torque.

The instantaneous torque exerted upon each armature conductor of an accelerating motor $= F = IBL\ 10^{-1}$ dynes, where I equals current in amperes in the conductor, B equals flux density in maxwells per square centimeter, and L equals length of conductor that is cut by the flux; or, in other words, since the length of active conductors in an armature is a constant, the torque exerted by the entire motor armature is substantially proportional to the armature current times the field flux or the field current which produces the flux. According to my present invention, I take advantage of the principles just recited by providing an auxiliary source of energy that is associated with the motor for "field control" purposes to cause a difference in the value of the armature and field winding currents, the said source being connected either in parallel relation with the field winding which is disposed in series relation with the armature, or being connected to separately excite the field winding, and a switching device or relay having a plurality of actuating coils that are respectively energized in proportion to the armature and field winding currents and are adapted to jointly effect the actuation of the switching device to exclude from the circuit a translating device, such as a resistor, a predetermined time after starting, to increase the voltage that is applied to the motor from the supply circuit, with the consequent motor acceleration. Inasmuch as a relatively heavy torque is usually required for starting purposes, especially in series-connected railway motors, the switching device referred to will remain inoperative with respect to the main-circuit translating device until the armature and the field-winding currents decrease to predetermined values to permit of the actuation of the switching device. Automatic acceleration is thus effected in terms of the motor torque, so to speak, since the switching device is influenced by the resultant of the electro-magnetic forces that are produced by the two actuating coils substantially in proportion to the torque exerted by the motor.

Whereas the above remarks apply primarily to direct-current motors, the same principles are of course applicable to alternating-current motors running with the repulsion connection, or during the transition from repulsion to doubly-fed connection, where in either case, the armature and main field-winding current are of different values. In such cases, it is also possible to compensate for phase displacement between the armature and field current, as hereinafter described.

The relay coil corresponding to the field winding may be energized in proportion to the field flux either directly by the field current or by the field voltage, the latter type of energization being particularly adaptable in alternating current systems. Moreover, since the auxiliary field current, in single-phase motors, is nearly proportional to the armature current, the auxiliary field winding may be utilized in place of the armature to energize one coil of the relay. It will also be understood that, instead of using the heavy armature or field current of alternating-current motors, small current-reducing transformers may be employed.

Figure 6:
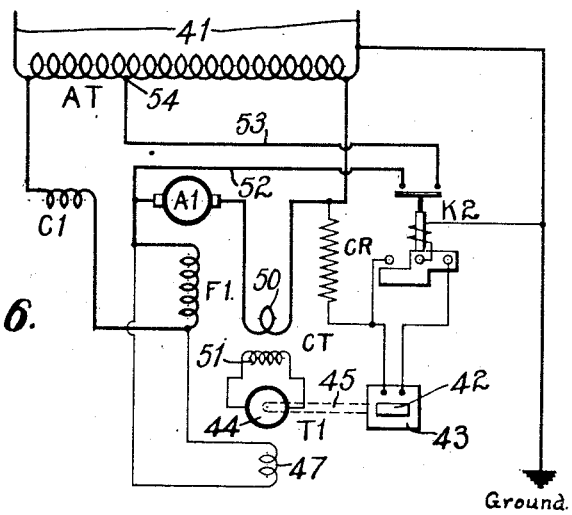
Figure 7:
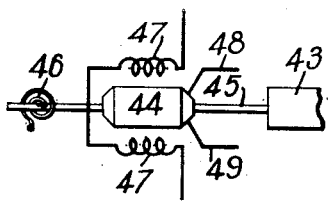
Figure 8:
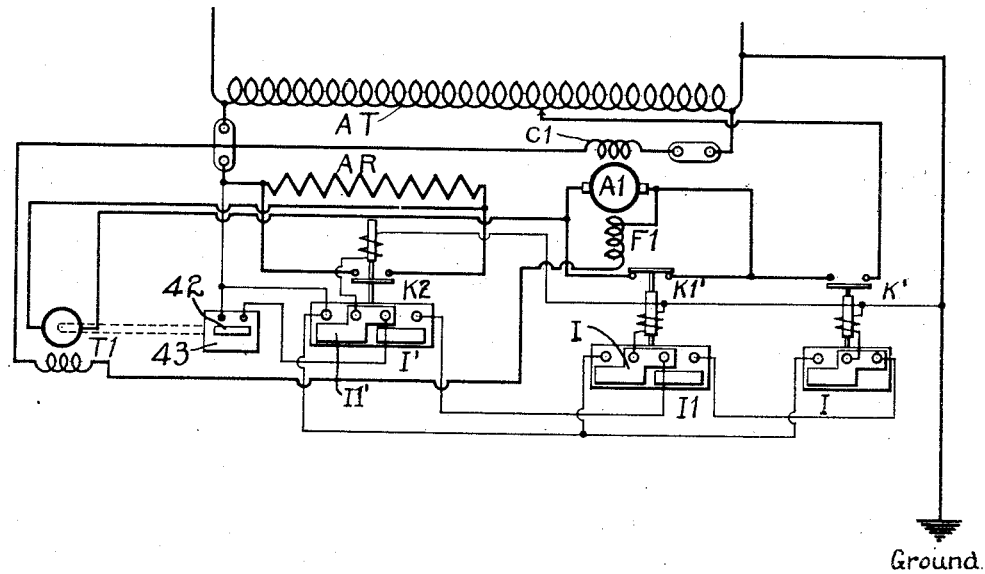

In the accompanying drawing, Figure 1 is a diagrammatic view of a system of control embodying my invention; Fig. 2 is a diagrammatic view of the main circuit of a system illustrating a modified form of my invention; Fig. 3 is a diagrammatic view of the auxiliary control circuits for governing the operation of the various motor-controlling switches shown in Fig. 2 in accordance with the sequence chart of well-known form that is illustrated in Fig. 4; Figs. 5, 6 and 8 illustrate modified systems embodying my invention; and Fig. 7 is an enlarged diagrammatic view of a portion of the apparatus shown in these figures.

Referring to Fig. 1 of the drawing, the system shown comprises a suitable supply circuit including conductors respectively marked "Trolley" and "Ground", an electric motor having an armature A and a series-connected field magnet winding F, a main-circuit switch S, an accelerating resistor AR that is adapted to be initially connected in the main motor circuit, a switching device K for short-circuiting the resistor AR; a torque relay T that is associated with the motor windings in a manner to be described; and a storage battery B which is variably connected in parallel-circuit relation with the field magnet winding F for purposes of field control, thereby providing means for governing the motor speed, in accordance with well-known principles.

The switching device or torque relay T is provided with an actuating coil 1 that is connected, through conductors 2 and 3, in series relation with the resistor AR and the armature A, and a second actuating coil 4 that is connected, through conductors 5 and $5^a$, preferably in series circuit relation with the armature A and the field-magnet winding F for direct-current operation, and preferably in parallel-circuit relation to the field winding for alternating-current operation. The actuating coils 1 and 4 are adapted to coöperatively act upon the core 6 of the switching device T to maintain a movable contact member 7 out of engagement with a pair of stationary contact members 8 during the initial starting period of the motor, as hereinafter described. The switching device K is of a familiar electrically-controlled type having coöperating stationary and movable main-circuit contact members 9 and 10, and an interlock I in its actuating coil circuit. The interlock I is also of a familiar form that is adapted to permit energization of the actuating coil through the contact members 7 and 8 of the torque relay T when the switching device K occupies its lower or, in this case, open position, and that is adapted to permit direct energization of the actuating coil when the device K occupies its upper or, in this case, closed position, thereby completing a holding circuit, as will be understood. The actuating coil of the switching device K may be supplied with energy from any convenient source, as from the "trolley" through a suitable control resistor CR, as shown in Fig. 1, or from a storage battery, as illustrated in Fig. 2.

The switching device K, when closed, is adapted to short circuit the accelerating resistor AR through conductor $9^a$, coöperating contact members 9 and 10 of the device, and conductor $10^a$.

Assuming the parts of the system to occupy the position shown, the operation of the system may be described as follows: Energy is supplied from the trolley through conductor 11, switch S in its closed position, conductor 12, the accelerating resistor AR, conductor 2, the relay coil 1, conductor 3, the armature A, conductor 14, where the circuit divides, one branch including conductor 5, relay coil 4, conductor $5^a$, and the field-magnet winding F, and the other branch including a predetermined portion, preferably all, of the cells of the battery B, in order to produce a relatively strong field flux, a common circuit being completed through conductor 15 to ground.

The heavy rush of current when the motor is initially connected to the supply circuit is sufficient to cause enough current to traverse the actuating coils 1 and 4 of the torque relay T to maintain it in its upper or open position. However, as soon as the motor has accelerated somewhat and its counter-electromotive force has increased a certain amount, the armature and field-winding currents and, consequently, the motor torque, decrease to respectively predetermined values, and the torque relay T is thereupon permitted to drop to its lower position, whereby the coöperating contact members 7 and 8 engage to energize the actuating coil of the switching device K, and the resistor AR is short-circuited, as already mentioned. The motor will thus be further accelerated to a predetermined point whereupon, if desired, the number of cells of the battery B that is connected in parallel relation with the field winding F may be decreased to correspondingly reduce the field current and correspondingly increase the motor speed. It will be observed that, once the device K is closed, its holding circuit referred to above, maintains it closed, irrespective of further actuation of the torque relay T.

Reference may now be had to Fig. 2 of the drawing, wherein is shown the supply conductors, "Trolley" and "Ground;" the armature A and the field winding F, which in this case, however, are not directly connected; the accelerating resistor AR; the torque relay T; the switching device K; a reversing switch RS, preferably of a familiar electro-magnetically controlled type, for reversing the electrical relations of the armature A and field winding F; a motor-generator set MG comprising a motor armature MA and generator armature GA, which are mechanically coupled together in some suitable manner as by a shaft $s$; a battery $B^1$ for driving the motor of the motor-generator set, and a plurality of motor-controlling switches LS and $K^3$.

The auxiliary motor, having the armature MA, is provided with a field winding $MF^1$ that is connected in series circuit with the main field winding F and the generator armature GA and the sections of which are adapted to be respectively short-circuited by switches $X^1$ and $X^2$ under predetermined conditions, and a second field winding $MF^2$ which is connected in shunt relation to the armature MA. The auxiliary generator is provided with a field winding $GF^1$ that is connected in the main motor circuit and a second field winding $GF^2$ that is connected in series with a field-regulating resistor FR across the battery $B^1$. The various sections of the resistor FR are respectively adapted to be short-circuited by switches $G^1$, $G^2$ and $G^3$. All of the switches shown, with the exception of the main reversing switch RS, the device K, and the torque relay T, which have already been described, are preferably of a familiar electromagnetically controlled type, and no further description thereof is deemed to be necessary.

Referring now to Fig. 3, the auxiliary control system shown comprises, in addition to the actuating coils of the various motor-controlling switches and of the main reversing switch RS that are illustrated in Fig. 1, an auxiliary source of energy which may conveniently comprise the battery $B^1$, a master controller that is adapted to occupy a plurality of successive operating positions $a$ to $h$, inclusive, and a master reverser MR of a familiar type.

Assuming that the master reverser MR and the main reversing switch RS respectively occupy their forward positions, and that the master controller MC is moved to its first operating position $a$, the operation of the system under consideration may be set forth as follows: A circuit is first established from one terminal of the battery $B^1$ through conductor 16, control finger 17, contact segments 18, 19 and 20 and control finger 21 of the master controller, conductor 22, the actuating coil of the switch $K^3$, and conductor 23 to the opposite terminal of the battery $B^1$. Other circuits are simultaneously established from energized contact segments 24 and 25 of the master controller, through control fingers 26 and 27 and conductors 28 and 29, respectively, to the actuating coils of the switches $X^1$ and $X^2$, and thence to the negative conductor 23.

If the master controller MC is then moved to its position $b$, a plurality of energized contact segments 30, 31 and 32, respectively engage control fingers 33, 34, and 35, from which points circuits are completed through conductors 36, 37 and 38, respectively, to the actuating coils of the switches $G^1$, $G^2$ and $G^3$ and the negative conductor 23.

It will be noted that the circuit arrangements just described are all preliminary to the operation of the main motor, which is first connected to the supply circuit when the master controller is moved to its position $c$, wherein the energized contact segment 19 engages a control finger 39, whence circuit is completed through conductor 40, the actuating coil of the line switch LS and the conductor 23 to the negative battery terminal.

The torque relay T will be raised to its open position by the initial connection of the main motor to the supply circuit, as described in connection with Fig. 1, and will subsequently drop to its lower position to effect short-circuit of the resistor AR by the switching device K, as also described in connection with that figure.

When the resistor AR has been excluded from circuit, the master controller MC may be moved to its position $d$, whereby the contact segment 30 disengages the control finger 33, and the switch $G^1$ is consequently opened. As the master controller is then moved to its positions $e$ and $f$, the switches $G^2$ and $G^3$ are also opened by reason of the respective disengagement of the control finger 34 and the contact segment 31, and the control finger 35 and contact segment 32.

The field-regulating resistor FR is thus gradually inserted in the circuit of the field winding $GF^2$ of the auxiliary generator, thereby causing a weakening of the generator field flux and, consequently, partially deënergizing the main field winding F to thereby effect an increase in the main-motor speed, as will be understood.

If the master controller MC is then successively moved to its positions $g$ and $h$, the switches $X^1$ and $X^2$ are successively opened by reason of the disengagement of the control fingers and contact segments of the master controller that are included in their respective control circuits, thereby gradually inserting the auxiliary motor field winding $MF^1$ in the main field-winding circuit and causing it to be operative upon the auxiliary motor armature MA. The auxiliary motor-field flux being thus strengthened, the motor will run at correspondingly decreased speeds, thus again decreasing the excitation of the main field winding F and bringing about a further acceleration of the main motor.

Reference may now be had to Fig. 5 and Fig. 6, which disclose my invention as applied to the operation of single-phase motors, Fig. 5 illustrates a method for automatically effecting the change in terms of the motor torque, from an initial connection as a repulsion motor to a straight series connection, while Fig. 6 shows a system for automatically effecting the change from the series to a doubly-fed connection. The system illustrated in Fig. 5 comprises a suitable supply circuit 41, to which is connected an auto-transformer AT, in accordance with familiar practice; an alternating current motor of the commutator type having an armature $A^1$, a main or exciting field-magnet winding $F^1$ and an auxiliary or compensating field-magnet winding $C^1$; a torque relay $T^1$ of the motor type, as hereinafter described; a switching device $K^1$, similar to the device K that is shown in Fig. 1 but adapted to normally occupy a closed position to short-circuit the armature $A^1$, under starting conditions; and a set of co-operating stationary and movable contact members 42 for effecting energization of the actuating coil of the switching device $K^1$ under predetermined conditions, which contact members may be suitably mounted on a drum 43 or otherwise, to be actuated by the torque relay $T^1$, as set forth below.

The relay $T^1$, best shown in Fig. 7, may comprise an armature 44 that is mounted upon a shaft 45 to which is also secured a suitable motor torque-opposing spring 46 on the drum or other member 43; and a suitable exciting field winding 47. Inasmuch as relatively small rotative movement of the armature 44 occurs, current-collecting apparatus of the usual type may be omitted, and the armature leads 48 and 49 may be suitably flexibly connected directly to the armature winding. The armature 44, in the system of Fig. 5, is connected in series relation with the motor armature $A^1$ and is included in the initial short-circuit thereof by the switching device $K^1$; and the field winding 47 is shown connected in series relation with the main field winding $F^1$, although a parallel connection is preferable in some cases, as hereinafter set forth.

A brief description of the operation of the system will be all that is necessary. The motor is started as a repulsion motor, its armature being short-circuited in the manner shown, the initial torque of the relay $T^1$ being sufficient to overcome the spring 46 and maintain the contact members 42 open-circuited. When the main armature and main field-winding currents decrease to respectively predetermined values, the armature 44, its torque being correspondingly reduced, is rotated somewhat by the spring 46 to effect engagement of the contact members 42, and thus energize the actuating coil of the switching device $K^1$ to remove the short-circuit from the armature $A^1$, thereby automatically effecting the change from repulsion to series connection of the main motor.

The apparatus employed in the system shown in Fig. 6 comprises all that is illustrated in Fig. 5, and, in addition, a current-reducing transformer CT has its primary winding 50 connected in series relation with the armature $A^1$, and its secondary winding 51 in series with the armature 44 of the torque relay, thereby reducing the current utilized by the relay armature to any desired value. The contact members 42 are shown as separate, and the switching device $K^2$ is shown as normally open, the motor thus being connected in series relation. It will be understood that, when a predetermined motor-torque condition is attained, the contact members 42 engage, by reason of the operation of the drum 43 by the spring 46, to complete a connection through the actuating coil of the switching device $K^2$, which is thus closed, thereby establishing a circuit from one terminal of the main armature $A^1$, through conductor 52, contact members of the device $K^2$ and conductor 53, to an intermediate point 54 of the auto-transformer winding, thereby connecting the motor in the doubly-fed relation. It will be understood by those skilled in the art that the systems illustrated in Fig. 5 and Fig. 6 may be suitably combined, if desired, as is described in connection with Fig. 8.

The effect of phase displacement between the armature and field current may be compensated for by the use of a relay connected as in Fig. 5, if the relay parts are magnetically saturated to the same degree as the main motor, thereby obtaining a torque from the relay that is substantially exactly proportional to the motor torque. Where the main field voltage is employed to energize the field winding of the relay, the ratio of the saturation may vary from equality.

Referring now to Fig. 8, the system shown embodies an automatically operating combination of the accelerating methods disclosed in Fig. 1, Fig. 5 and Fig. 6. The system comprises the auto-transformer AT; the single-phase motor having armature $A^1$ and series field windings $F^1$ and $C^1$; the torque relay $T^1$ that is connected as in Fig. 5; the switching device $K^2$; and a plurality of switching devices $K'$ and $K^{1\prime}$, that respectively resemble the device K and $K^1$ but, that, in addition, are provided with interlocking members I and $I^1$ of a familiar type for effecting automatically progressive operation of the switching devices, according to the movement of the torque relay $T^1$. This type of interlocking apparatus is familiar to those skilled in the art of automatic control systems, particularly systems for the control of railway motors, and no further description thereof is deemed necessary here.

The operation of the system may be briefly set forth as follows: the motor is started, with the various switches in the respective positions shown, whereby the motor armature $A^1$ is short-circuited by the switch $K^{1\prime}$, and the resistor AR is included in the motor circuit. The auxiliary contact members 42 that are associated with the torque relay $T^1$ are initially held open by reason of the predominance of the torque produced over the force of the spring 46 (Fig. 7). When the motor armature and field currents or torques decrease to respectively predetermined values, the corresponding torque of the relay T¹ decreases to a value such that the spring 46 moves the drum 43 to effect engagement of the contact members 42, thereby completing the energizing circuit of the actuating coil of the device K² and thus causing permanent short-circuit of the resistor AR, since the device K² is interlocked in its closed position by means of the holding-circuit connection hereinbefore described.

The rush of current occurring upon the short-circuit of the resistor AR, effects a temporary disengagement of the contact members 42. When the contact members again engage by reason of the decrease of motor current and torque, the actuating coil of the switching device K¹' is energized through the interlock I' of the device K², and the motor is thus changed from repulsion to series connection. Similarly the switch K¹ is subsequently actuated, according to the movement of the torque relay T¹, to connect the motor in doubly-fed relation.

Various modifications in the specific circuit connections and arrangement of parts herein set forth may be made within the spirit and scope of my invention, and I desire, therefore, that only such limitations shall be imposed as are indicated in the appended claims.

I claim as my invention:

1. In a system of control, the combination with a supply circuit, and an electric motor having an armature and a series field-magnet winding, said armature being adapted to receive currents of different value from those flowing through the field winding, of a main-circuit translating device initially connected in circuit with the armature and the field winding of said motor, and means for excluding said translating device from circuit upon a predetermined variation of machine torque.

2. In a system of control, the combination with a supply circuit, and an electric motor having an armature and a field-magnet winding, said armature being adapted to receive currents of different value from those flowing through the field winding, of means included in the circuit of the armature and of the field winding for automatically changing the amounts of current flowing through the armature and the field winding to effect acceleration of the motor.

3. In a system of control, the combination with a supply circuit, and an electric motor having an armature and a field-magnet winding, of a main-circuit translating device initially connected to the armature and the field winding of said motor, and means influenced in proportion to both the armature and field-winding currents for automatically excluding said device from circuit to effect acceleration of the motor.

4. In a system of control, the combination with a supply circuit, and an electric motor having an armature and a field-magnet winding, of a main circuit translating device initially connected to said motor, and a switching device having a plurality of actuating coils respectively energized in proportion to the armature and the field-winding currents and adapted to jointly effect the actuation of said switching device to exclude said translating device from circuit upon a predetermined variation of motor torque.

5. In a system of control, the combination with a supply circuit, and an electric motor having an armature and a field-magnet winding, of an auxiliary source of energy connected to said motor to cause a difference in the values of the armature and field-winding currents, and means influenced by the electrical conditions of both the armature and field winding to automatically effect acceleration of the motor.

6. In a system of control, the combination with a supply circuit, and an electric motor having an armature and a field magnet winding, of an auxiliary source of energy connected to said motor to cause a difference in the values of the armature and field-winding currents, a main-circuit translating device initially connected to said motor, and means influenced in proportion to both the armature and field-winding currents for automatically excluding said translating device from circuit to effect acceleration of the motor.

7. In a system of control the combination with a supply circuit, and an electric motor having an armature and a field-magnet winding, of an auxiliary source of energy connected to said motor to cause a difference in the values of the armature and field winding currents, a main-circuit translating device initially connected to said motor, and a switching device having a plurality of actuating coils respectively energized in proportion to the armature and the field-winding currents and adapted to jointly effect the actuation of said switching device to exclude said translating device from circuit upon a predetermined variation of motor torque.

8. In a system of control, the combination with a supply circuit, and an electric motor having an armature and a field-magnet winding, of a switching device for initially effecting a predetermined set of connections of the motor windings, and controlling means for said device influenced in proportion to both the armature and field-winding currents for automatically actuating said device to effect another set of motor connections.

9. In a system of control, the combination with a supply circuit, and an electric motor having an armature and a field-magnet winding, of a switching device for initially effecting a predetermined set of accelerating connections of the motor windings, and controlling means for said device adapted to be actuated in proportion to the motor torque for automatically actuating said device to effect another set of motor connections for further acceleration.

10. In a system of control, the combination with a supply circuit, and an electric motor having an armature and a field-magnet winding, of a switching device for initially effecting a predetermined set of connections of the motor windings, and controlling means for said device comprising a torque relay having an armature and a field winding respectively energized in proportion to the motor armature and field-winding currents for automatically actuating said device to effect another set of motor connections under predetermined motor-torque conditions.

In testimony whereof I have hereunto subscribed my name this 19th day of Nov., 1914.

RUDOLF E. HELLMUND.

Witnesses:
JOHN S. DEAN,
B. B. HINES.